United States Patent
Rasmussen

(10) Patent No.: US 9,849,641 B2
(45) Date of Patent: Dec. 26, 2017

(54) METHOD AND APPARATUS FOR HELICAL CUTTING OF A TUBULAR FILM

(76) Inventor: Ole-Bendt Rasmussen, Walchwil (CH)

( * ) Notice: Subject to any disclaimer, the term of this patent is extended or adjusted under 35 U.S.C. 154(b) by 1095 days.

(21) Appl. No.: 13/704,728

(22) PCT Filed: Jun. 17, 2011

(86) PCT No.: PCT/EP2011/060170
§ 371 (c)(1),
(2), (4) Date: Apr. 4, 2013

(87) PCT Pub. No.: WO2011/157843
PCT Pub. Date: Dec. 22, 2011

(65) Prior Publication Data
US 2013/0181364 A1   Jul. 18, 2013

(30) Foreign Application Priority Data

Jun. 17, 2010  (GB) .................................. 1010158.2

(51) Int. Cl.
| | | |
|---|---|---|
| *B29C 47/00* | (2006.01) | |
| *B29D 7/01* | (2006.01) | |
| *B29C 47/14* | (2006.01) | |
| *B29C 47/36* | (2006.01) | |
| *B29C 47/72* | (2006.01) | |
| B29C 47/08 | (2006.01) | |
| B05C 5/02 | (2006.01) | |

(52) U.S. Cl.
CPC ............ *B29D 7/01* (2013.01); *B29C 47/0021* (2013.01); *B29C 47/14* (2013.01); *B29C 47/364* (2013.01); *B29C 47/72* (2013.01); *B05C 5/0254* (2013.01); *B29C 47/0811* (2013.01); *B29C 2947/92514* (2013.01); *B29C 2947/92704* (2013.01); *B29C 2947/92904* (2013.01)

(58) Field of Classification Search
CPC ... B29C 47/14; B29C 47/0021; B29C 47/364; B29C 47/72; B29C 47/0811; B29C 47/92; B29C 2947/02514; B29C 2947/92904; B29C 2947/92704
USPC ...................................................... 264/37.26
See application file for complete search history.

(56) References Cited

U.S. PATENT DOCUMENTS 4,675,208 A * 6/1987 Kageyama ............ B05C 1/0813
                                                              118/259

FOREIGN PATENT DOCUMENTS

IT   WO 02076705 A1 * 10/2002  ......... B29C 47/0021

* cited by examiner

*Primary Examiner* — Christina Johnson
*Assistant Examiner* — Xue Liu
(74) *Attorney, Agent, or Firm* — Robert W. Strozier

(57) ABSTRACT

A method of forming a film (1) of molten polymer material, by extruding said material in a direction (2) out of a narrow exit slot (3), which is an integral part of a wider die chamber (4) of which the major dimension of extension is parallel with the major dimension of the exit slot (3), characterized in that the molten polymer material is formed into one or more flows generally parallel with said major dimension of the exit slot (3), each said flow being pumped in a re-circulating arrangement from the chamber inlet (7) to the outlet (8) through conduits connecting the inlet to the outlet, while fresh molten polymer material is administered from a reservoir into each re-circulating flow.

21 Claims, 3 Drawing Sheets

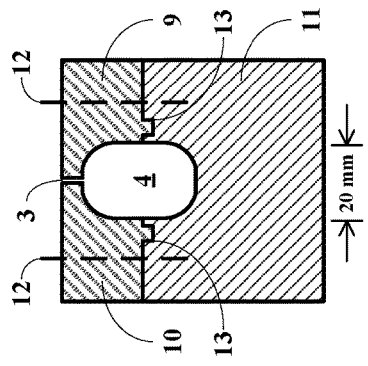
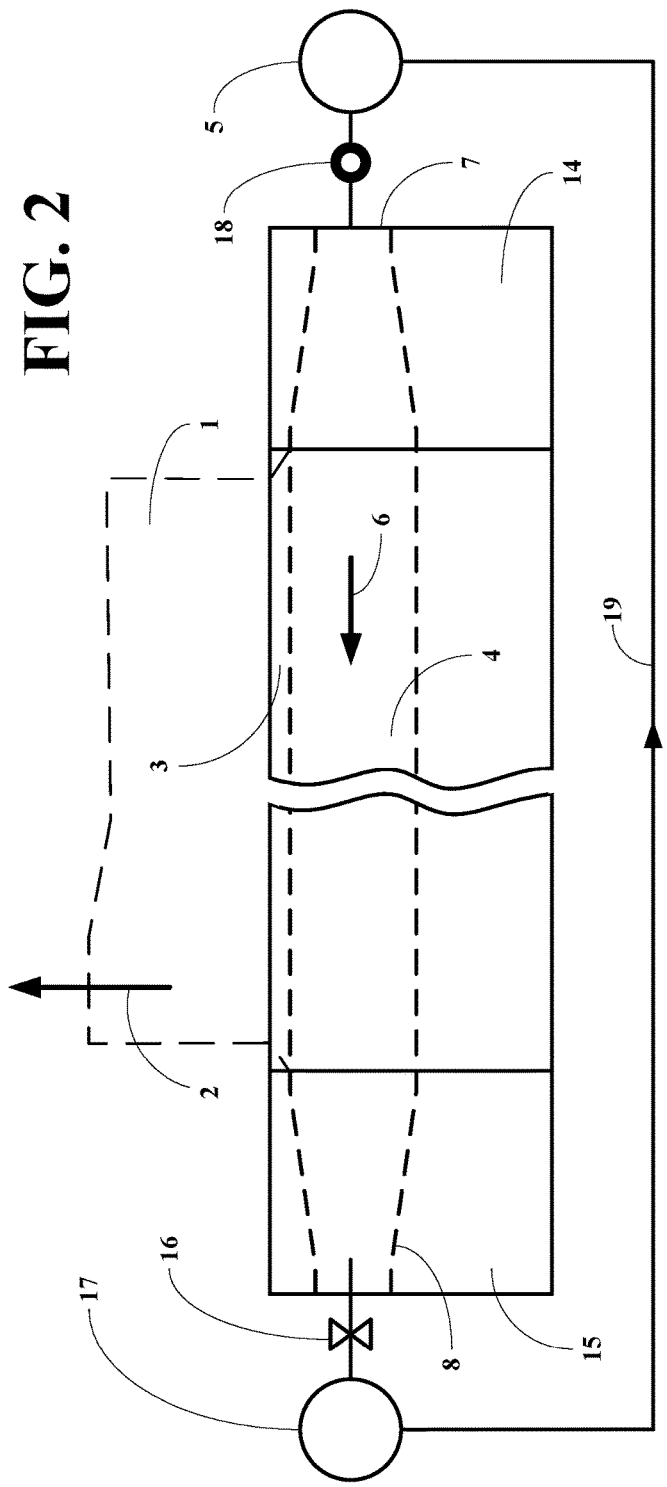
FIG. 2
FIG. 1

METHOD AND APPARATUS FOR HELICAL CUTTING OF A TUBULAR FILM

RELATED APPLICATIONS

This application is a 35 U.S.C 371 national phase filing of PCT/EP20111060170 filed 17 Jun. 2011 published as WO2011/157843A1 published 22 Dec. 2011, which claims priority to GB1010158.2 filed 17 Jun. 2010.

BACKGROUND OF THE INVENTION

1. Field of the Invention

The invention concerns a method of forming a film by extruding a molten polymer material through a flat monoextrusion die, and the apparatus for carrying out this method.

2. Description of the Related Art

By monoextrusion of film it is meant extrusion of a mono-component, monolayered film as opposed to the coextrusion of bicomponent or multicomponent film. Monocomponent, monolayered film extruded from a flat die, is used in itself, e.g. for manufacture of plastic bags or as wrapping film for a variety of packaging purposes. It is also used, normally in form of a very thin and still molten film, as it comes out of the flat die, for coating or extrusion lamination of other film materials.

The present invention is conceived with a particular view to such coating or extrusion lamination applications, although it also with advantage can be used in itself for bag making, wrapping etc.

To the knowledge of the inventor, all industrially flat extrusion dies—when they are of a considerable width, e.g. 1 m or more from one film edge to the other—are so called "coat hanger dies". In such wide, flat dies, the polymer flow coming from a reservoir such as an extruder is fed into a chamber from its middle, and flows transversely towards both sides of the chamber. This is integral with the exit slot. The chamber narrows down towards its two sideways ends so that the transverse flow maintains an almost constant velocity.

The gap of the exit slot in the "coat hanger die" is adjustable by means of a row of screws or similar to compensate for the relatively big pressure differences between the middle and each side end of the channel. When such coat hanger dies are used for coating or for extrusion lamination, there are difficulties in achieving the very low film thicknesses, which normally are desirable. This requires high temperatures at which the polymer material tends to degrade or cross-link or both. To avoid or reduce these effects, high throughputs and therefore particular high take off velocities of the film is needed.

In many cases this is not rational, since it makes the machine costs high. Thus, lower throughputs would often be preference if any tendency towards stagnation and similar could be avoided.

SUMMARY OF THE INVENTION

One objective is to reduce any tendency to stagnation and reduce the average dwell time of the molten polymer in the die, and thereby reducing the tendency to degradation and/or gel formation. As a consequence higher die temperatures can be applied.

This improvement will enable a reduction of the film thickness without risk of break.

Furthermore the invention aims at cost reductions in the construction of the die, compared to current designs of flat monoextrusion dies.

BRIEF DESCRIPTION OF THE DRAWINGS

The invention shall now be described in further detail with reference to the drawings, of which FIG. 1 is a view perpendicular to the plane formed by the extruded film. It shows the flat die including, very schematically, a diagram like presentation of the system for circulating the molten polymer material, whereby it is pumped into one end of the die and leaves the other end of the die.

FIG. 2 is a cross section through the flat die.

DETAILED DESCRIPTION OF THE INVENTION

Figure 3:
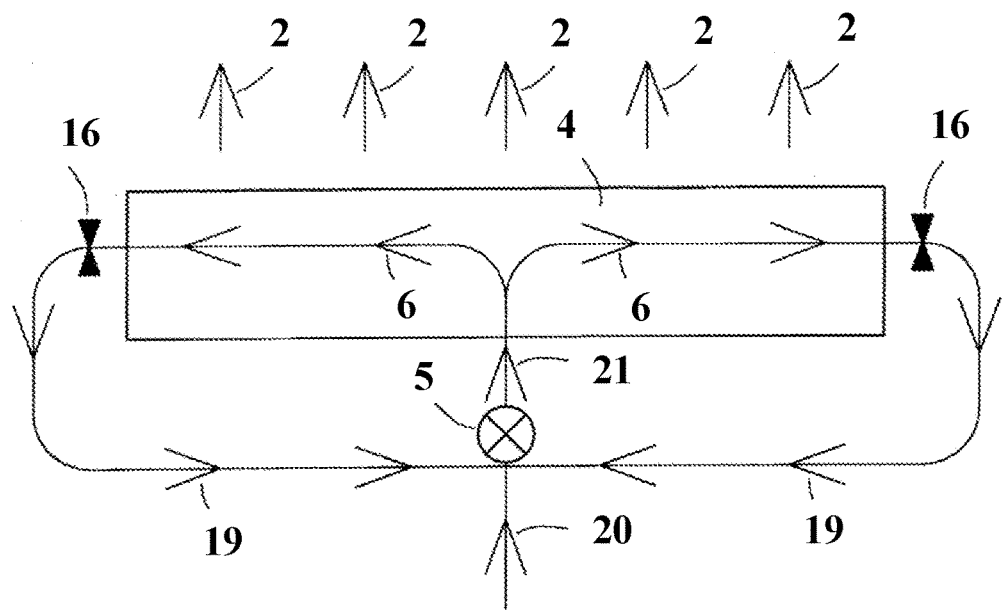
FIGS. 3, 4 and 5 are principal sketches, which schematically show three different embodiments of the invention, each operating with more than one circulating flow.

The method of the present invention comprises forming a film (1) by mono-extrusion of molten polymer material, by extruding said material through a flat-die in a direction (2) out of a narrow exit slot (3), which is an integral part of a wider die chamber (4) of which the major dimension of extension is parallel with the major dimension of the exit slot (3), characterized in that the molten polymer material is formed into one or more flows generally parallel with the major dimension of the exit slot (3), each flow being pumped in a re-circulating arrangement from at least one chamber outlet (8) to at least one chamber inlet (7) through a conduit (19) connecting the at least one chamber inlet (7) to the at least one chamber outlet (8), while fresh molten polymer material is administered from a reservoir entering into the conduit (19) for each re-circulating flow. The apparatus of the present invention for extruding a film of molten polymer material comprising a flat die for mono-extrusion of a film (1), a die chamber (4) comprising at least one chamber inlet (7), at least one chamber outlet (8) and an exit slot (3), a conduit (19) connecting the at least one chamber outlet (8) to the said at least one chamber inlet (7), one or more pumps for re-circulating molten polymer passing through the chamber (4) and the conduit (19), and a means for feeding fresh molten polymer material from a reservoir (18) into the conduit (19). The circulating character of the flow essentially reduces the tendency to stagnation and the like and enables a reduction of the average dwell time in the die. The equalizing effect of the circulation enables a strong heating of the die, and thereby it becomes possible to keep the temperature of the material in the extruder much lower than the temperature of the material in the die. This furthermore reduces the tendency to degradation and/or gel formation.

In the another embodiment the molten polymer material is formed into only one flow parallel with the major dimension of the exit slot (3) by being fed by a pump (5) from chamber inlet (7) at one side of the chamber (4) to the chamber outlet (8) at the other side of the chamber.

In order to minimize the ratio by which the pressure drops while the circulating flow passes the chamber (4) there is preferably set up a relatively high resistance to the flow when this has left the outlet of the chamber, and an embodiment of the invention is characterized in that the pressure of the molten polymer material inside the chamber (4) is controlled by a variable valve (16) inserted between the chamber outlet (8) and the pump (17).

To get full effect of the invention, the big majority of the molten polymer material fed into the chamber (4) should be re-circulated instead of moving out of the exit slot (3). Thus, another embodiment of the invention is characterized in that the throughput of molten film forming material through the exit slot (3) is lower than 50%, preferably lower than 25%, and most preferably lower than 15% of the throughput of molten material passing out of the chamber outlet (8).

A third embodiment of the invention has for its object the means which secures that the film (1) coming out of the exit slot (3) has the same thickness all over. In the conventional construction of a flat die, this is secured by a row of adjustment screws—as already mentioned—which is an expensive construction. However, in a preferred embodiment of the present invention, the gap of the exit slot (3) is constant from one side to the other, while the distance through which the material passes through the slot (6) gradually varies from a higher value adjacent to the chamber inlet (7) to a lower value adjacent to the chamber outlet (8), to compensate for the pressure drop in the chamber from the inlet to the exit.

As it already has been mentioned, one advantage of the invention is that the temperature within the die can be kept much higher than the temperature of the polymer material leaving the extruder. Hereby the circulation of the flow plays an important role since it helps to keep the temperature even within the die also when a strong heating of the latter takes place. In this connection, a further embodiment of the invention is characterized in that the temperature of the film (1) as it leaves the exit slot (3) is at least 20° C. higher than the temperature of the fresh molten polymer material administered from the reservoir, as this material enters the circulating polymer flow.

One advantage of feeding the flat die from an inlet located at one side of the sideways elongated chamber (4) concerns the start up procedure. During start up the die should not send lumps of material down into the take off devices, and therefore the extruder and the die are normally set up on wheels, and pulled away from the take off devices during the beginning of the start up. This can be much simpler arranged according to the present invention, since the construction of the die near the chamber inlet (7) and generally parallel with the direction (2) in which the film (1) is extruded.

In the foregoing, the die is fed from chamber inlet (7) at one side of the chamber, goes out of the chamber outlet (8) at the other side of the chamber and is recirculated to the inlet (7). This has several advantages as explained above. However, it is also within the scope of the invention to feed the circulating flow at the middle of the sideways elongated chamber (4), and by means of pumping effect let it perform two circulating flows. One from middle to one side of the elongated chamber (4) and back to its middle, the other from middle to the other side of the elongated chamber (4) back to its middle. This modification of the invention does not have the effect to provide the above mentioned possibility of a facilitated start up, but it can nevertheless be preferable if the die is several meter long.

In the drawings, the film (1) of molten material leaves the die in direction (2), coming out of the exit slot (3). This slot is an integral part of the die chamber (4). The chamber and the exit slot are formed between the two die parts (9) and (10) which are fixed to a dieblock (11) by means of screws, indicated by the lines (12). Tracks (13) secure a precise fitting. The ends of the die are formed by the endparts (14) and (15), which are screwed to the dieparts (9) and (10) and to the dieblock (11). (The screws are not indicated).

The molten material is fed by the pump (5) from chamber inlet (7) through the chamber (4) in a flow direction (6) which is transverse of the direction (2) in which the film leaves the die. The transverse flow leaves the chamber (4) through the chamber outlet (8). Hereby the throughput through chamber outlet (8) exceeds the throughput through the exit slot (3), e.g. it may be about 10 times as high.

A valve (16) controls the pressure at the chamber outlet (8), and a second pump (17) may assist pump (5). The two pumps must be adapted to work at the same throughput. From pump (17) the flow is pumped back to pump (5) as indicated by the arrow (19). The channel part for this recirculation is not shown. This part and the die itself is heated, and the strong circulation of molten material secures an even temperature of the molten film (1) leaving the die. The pump may be a gearwheel pump.

Fresh molten material is fed into the system from a reservoir through a pipe (18) which is perpendicular to the view plane. The fitting between this pipe and the conducts between pump (5) and inlet (7) is adapted to allow the whole die including pumps and recirculation channel part to swing away from the take off means during start up.

Figure 4:
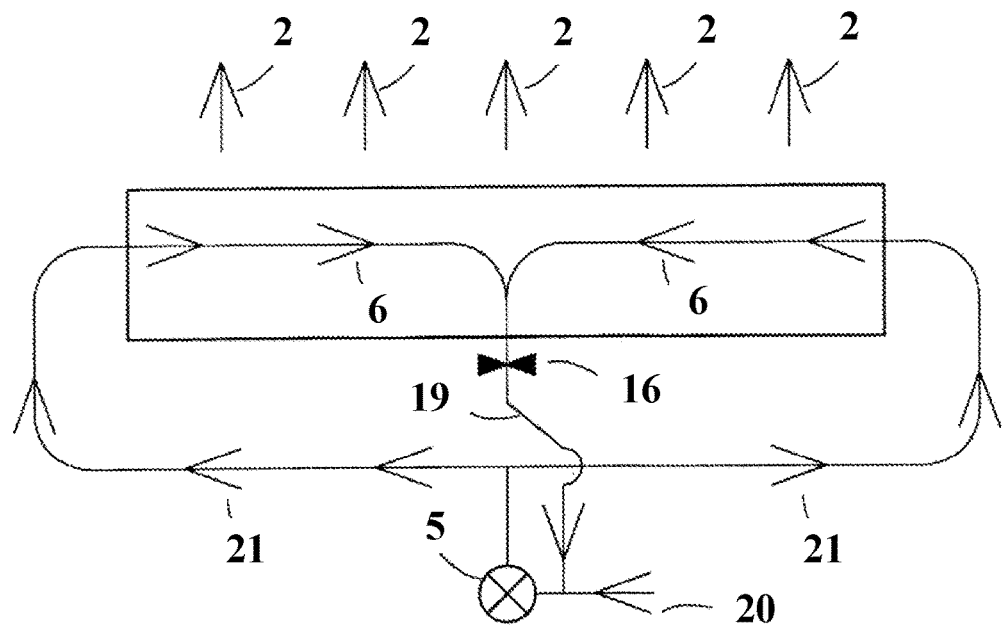
Figure 5:
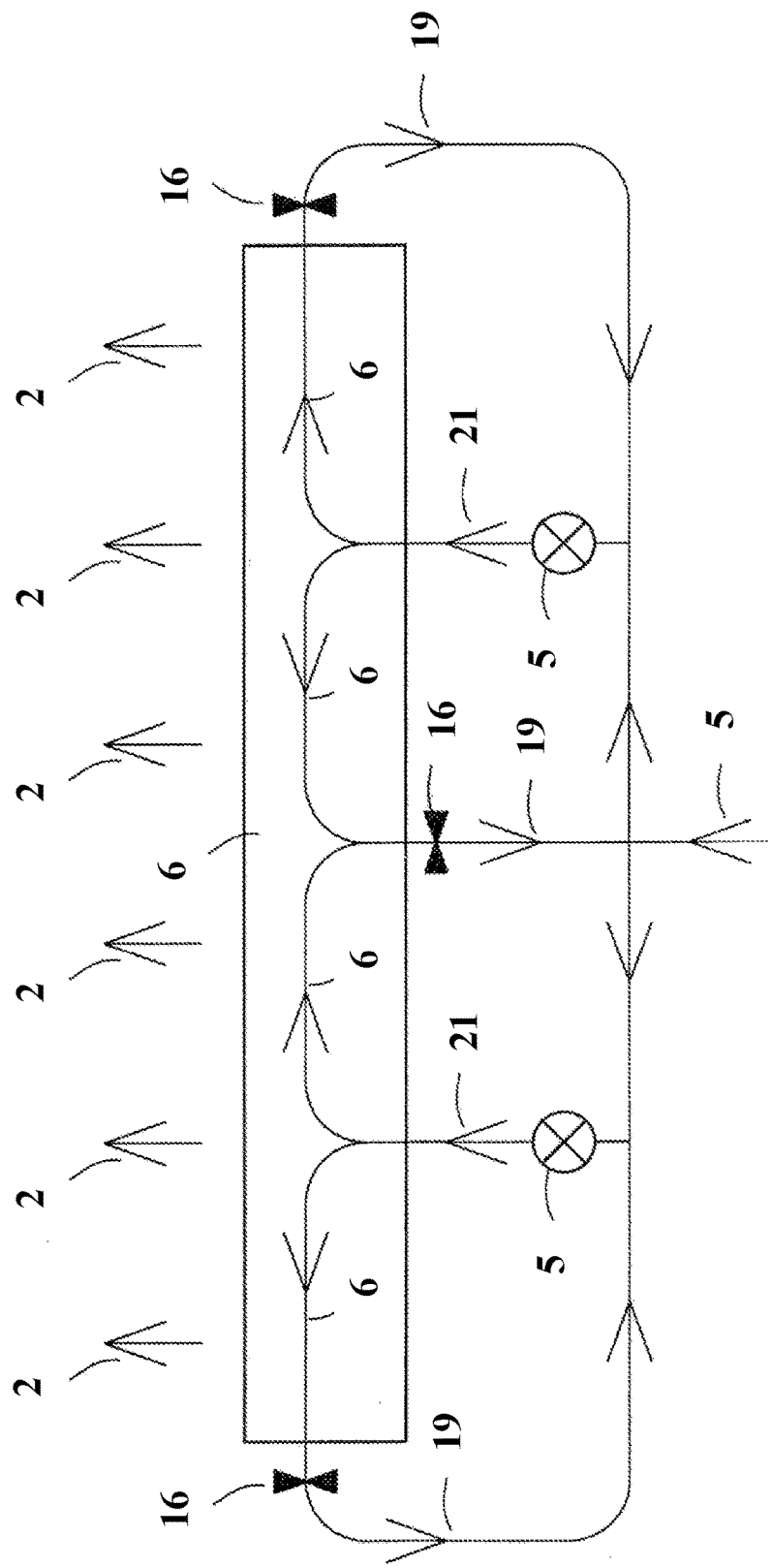

While the embodiment of the invention which is shown in FIGS. 1 and 2, is most practical when the die is relatively short, e.g. up to about 50-70 cm length, the embodiments shown in FIGS. 3, 4 and 5 can be more suitable for longer dies, since the arrangement of more than one circulating flow makes it easier to give the extruded film the same thickness all over. With the following short description, the sketches speak for themselves.

From an extruder the molten polymer material is directed, as indicated by the arrows (2), into one or more pumps (5), and is pumped, as shown by arrows (21), into an inlet to the die chamber (4).

It flows through the chamber (4) as indicated by the arrows (6) towards one or more outlets from the chamber.

Valves (16) control the pressure in the chamber. Having left the chamber, the molten material flows back towards pump (5) as indicated by arrows (19).

The invention claimed is:

1. A method of forming a flat film by mono-extrusion of a molten thermoplastic polymer material, by feeding the material into at least one inlet section of an elongated die-chamber heated to a temperature above a melting range of the polymer material and extruding the molten polymer material out of a narrow exit slot, which is parallel with a longitudinal direction of the die-chamber, and making a major part of the polymer material contents of the elongated die-chamber flow generally parallel with a longitudinal die-chamber direction and out of at least one outlet section of the die-chamber, from where the flow is recirculated back into the at least one inlet section of the elongated die-chamber.

2. The method according to claim 1, characterized in that a throughput of the re-circulating flow exceeds a throughput of molten polymer material passing through the exit slot.

3. The method according to claim 2, characterized in that the throughput of the molten polymer material passing through the exit slot is less than 50%, less than 25% or less than 15% of the throughput of the re-circulating flow.

4. The method according to claim 1, characterized in that the molten polymer material is formed into only one flow parallel with the major dimension of the exit slot by being fed into a chamber inlet at one side of the chamber to a chamber outlet at the other side of the chamber.

5. The method according to the claim 4, characterized in that a gap of the exit slot is constant from one side to the other, while a distance through which the molten polymer material passes through the slot gradually varies from a higher value adjacent to the chamber inlet to a lower value adjacent to the chamber outlet, to compensate for a pressure drop in the chamber from the inlet to the outlet.

6. The method according to claim 4, characterized in that a construction of the die is such that the die swings around an axis near the chamber inlet and generally parallel with the direction in which the film is extruded.

7. The method according to claim 1, characterized in that the molten polymer material is pumped through at least one chamber inlet into a middle of the die and from there the molten polymer branches to both sides and exits the die through at least two outlets positioned at both ends of the die.

8. The method according to claim 7, characterized in that the molten polymer material exits the die through at least one additional outlet in a middle of the die.

9. The method according to claim 1, further comprising:
pumping the molten polymer material through inlets positioned at both ends of the die and exits through an outlet located at a middle of the die.

10. The method according to claim 1, characterized in that a temperature of the film as it leaves the exit slot is at least 20° C. higher that a temperature of the fresh molten polymer material as it enters the re-circulating flow.

11. A method of forming a mono-extrusion film comprising:
feeding a polymer material into at least one inlet of an elongated die-chamber heated to a temperature above a melting range of the polymer material further including at least one outlet and a narrow exit slot,
forming at least one flow of the molten polymer material between the at least one inlet and the at least one outlet, where the at least one flow has a flow direction parallel with a longitudinal dimension of the die-chamber and generally perpendicular to an extrusion direction through the exit slot,
extruding a portion of the molten polymer material through the exit slot in the extrusion direction to form the mono-extrusion film, and
re-circulating the at least one flow back to the at least one inlet producing at least one recirculating flow,
where a throughput of the at least one re-circulating flow exceeds a throughput of the extruded film.

12. The method according to claim 11, wherein:
introducing fresh molten polymer material into the at least one re-circulating flow.

13. The method according to claim 12, wherein:
the feeding step feeds the molten polymer material into a plurality of inlets,
the forming step forms a plurality of flows of the molten polymer material between the plurality of inlets and a plurality of outlets,
the re-circulating step re-circulates the plurality of flows producing a plurality of re-circulating flows, and
the introducing step introduces fresh molten polymer material into each of the re-circulating flows,
where a throughput of the re-circulating flows exceeds a throughput of the extruded film and the plurality of inlets is the same or different from the plurality of outlets.

14. The method according to claim 13, wherein:
in the feeding and recirculating steps, the throughput of the extruded film is less than 50%, less than 25%, or less than 15% of the throughput of the re-circulating flows.

15. The method according to claim 11, wherein:
in the feeding step, the elongated die-chamber includes an inlet disposed at one end of the di-chamber and an outlet disposed at the other end of the die-chamber.

16. The method according to claim 15, wherein:
in the feeding step, the elongated die-chamber further includes
a gap of the exit slot is constant from one side to the other, while a distance through which the molten polymer material passes through the exit slot gradually varies from a higher value adjacent to the chamber inlet to a lower value adjacent to the chamber outlet to compensate for a pressure drop in the chamber from the inlet to the outlet.

17. The method according to claim 11, wherein:
in the feeding step, the elongated die-chamber includes an inlet disposed in a middle thereof
and two outlets disposed at opposite ends of the flat-die.

18. The method according to claim 11, wherein:
in the feeding step,
a construction of the die-chamber is such that the die chamber swings around an axis near the die-chamber inlet and generally parallel with the direction in which the film is extruded.

19. The method according to claim 11, wherein:
in the feeding step, the elongated die-chamber includes two inlets disposed at opposite ends of the flat-die;
and an outlet disposed in a middle of the flat-die.

20. The method according to claim 11, wherein:
in the feeding step, the elongated die-chamber includes two inlets disposed at two locations along a length of the die-chamber
and three outlets disposed in a middle and opposite ends of the die-chamber.

21. The method according to claim 11, wherein the elongated die-chamber is pipe-shaped.

* * * * *